Figure 1:
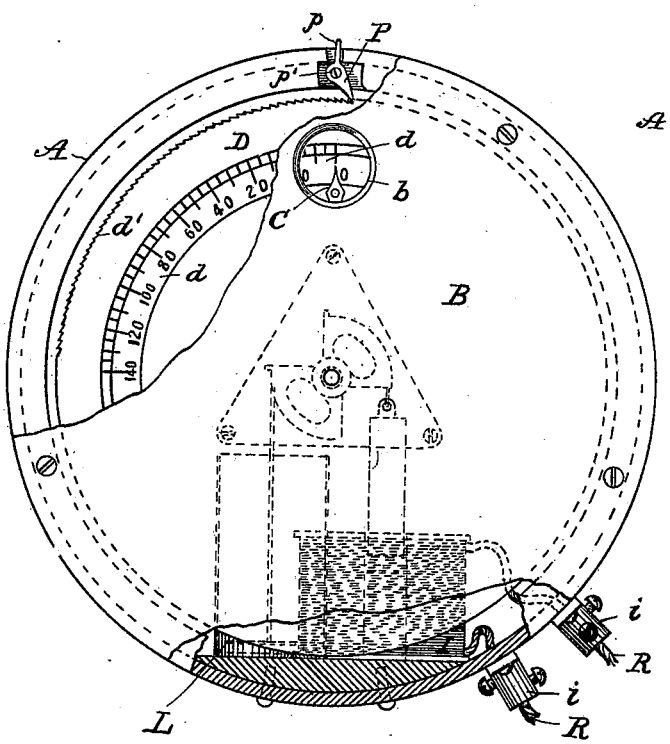

No. 623,861. Patented Apr. 25, 1899.
H. W. YOUNG.
MAXIMUM METER.
(Application filed Nov. 26, 1898.)

(No Model.)

Witnesses

Inventor
Herbert W. Young
By his Attorney

UNITED STATES PATENT OFFICE.

HERBERT W. YOUNG, OF PENACOOK, NEW HAMPSHIRE.

MAXIMUM-METER.

SPECIFICATION forming part of Letters Patent No. 623,861, dated April 25, 1899.

Application filed November 26, 1898. Serial No. 697,513. (No model.)

*To all whom it may concern:*

Be it known that I, HERBERT W. YOUNG, a citizen of the United States, residing at Penacook, in the county of Merrimac and State of New Hampshire, have invented certain new and useful Improvements in Maximum-Meters; and I do hereby declare the following to be a full, clear, and exact description of the invention, such as will enable others skilled in the art to which it appertains to make and use the same.

My invention relates to instruments for measuring the maximum current in an electric circuit; and it consists in the combination, with a solenoid which is connected in a circuit, of an armature carrying a disk, wheel, or segment of a circle having serrations in its edge and a graduated scale on its face arranged to pass a fixed pointer or stylus, as fully set forth in the following specification and claims and clearly illustrated in the drawings accompanying and forming a part of the same, of which—

Figure 2:
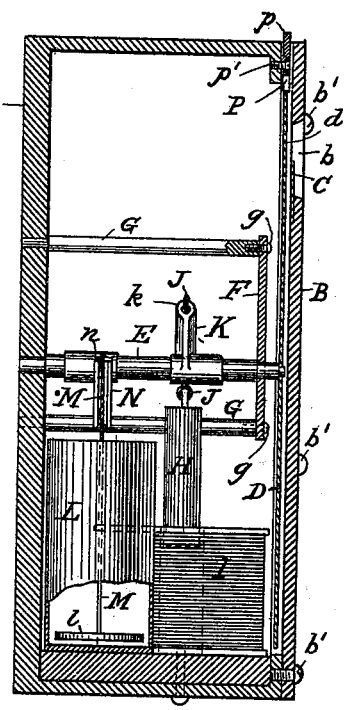
Figure 3:
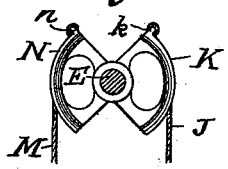

Figure 1 is a broken front elevation of my improved instrument, Fig. 2 being a cross-sectional elevation, and Fig. 3 is a detail.

A is a case for inclosing my improved mechanism, which in the drawings is shown circular; but any desired form may be adopted which is found convenient. The case is provided with a detachable cap or front B, secured to the case by screws $b'$, and said cap is provided with an opening $b$ for exposing to view the movable scale $d$ and with a pointer or stylus C for indicating or registering on said scale the load on the circuit. The said scale is formed upon one side of a movable disk, wheel, or wheel-segment D, which is secured upon one end of an arbor E, which is journaled at one end in the back of the case A and near the opposite end in a plate or frame F, which is secured by screws $g$ to one end of rods or tubes G, which rods are secured to the back of the case and extend forward, terminating short of the front, as shown. The arbor E is given a rotary motion by some suitable connection with the core H of the solenoid I, which is secured within the case and may be connected at $i$ $i$ with the wires R R of a circuit. This movement of the arbor E may be effected by means of a cord or flexible connection J, attached at one end to the core H of the solenoid, the other end passing over and secured, as at $k$, to a grooved wheel or segment K, mounted on said arbor E.

It is desirable to prevent a too violent movement of the index or disk D, and for this purpose a dash-pot L is employed, its follower or plunger $l$ being covered by some non-evaporative liquid and connected by a cord or flexible connection M, as at $n$, to a second wheel or wheel-segment, as at N, which is also mounted on the arbor E.

It is obvious where a different form of case is used, affording ample room for the inclosed mechanism, this cord M may be attached to the same wheel or segment to which the cord from the core H is attached with equally good results.

The serrations $d'$, formed in the periphery of a portion of the index-wheel or segment D, are engaged by a pawl P, pivoted at $p'$ to said case, and said pawl may be provided with an arm $p$, extending through one of the side walls of said case A for conveniently disengaging said pawl from the teeth or serrations of said index-wheel D when desired without the necessity of opening said case.

Having described my improvements, what I claim is—

1. In a galvanometer, the combination with a rotary shaft one end of which is journaled in the frame and the other in a plate supported by the frame, a disk or segment secured to the shaft, said disk being provided on one face with graduations, and serrations partly around its periphery, a pawl pivoted in the frame engaging the serrations and a fixed pointer standing in the path of the disk; of two grooved segments secured to the rotary shaft, a solenoid within the case, an oscillating core in the solenoid, a flexible connection between the core and segment, a dash-pot also within the case, a plunger, a flexible connection between the plunger and the second segment, and means for energizing the solenoid, substantially as and for the purpose set forth.

2. In a galvanometer the combination with a case, a removable front secured thereto and provided with an opening, an index standing within the opening, rods secured to the back of the case extending forward and terminating short of the front, and a plate secured across the ends of said rods and provided with an opening in its body; of a rotary shaft one end of which is journaled in the back of the case and the other in the plate, a graduated disk secured to said shaft, means for preventing the backward movement of said disk, segments secured to the shaft within the case, a dash-pot, a plunger therein, a solenoid, an oscillating core, flexible connections between the core and one segment, and the plunger and the other segment and means for energizing the solenoid, substantially as and for the purpose set forth.

In testimony whereof I affix my signature in presence of two witnesses.

HERBERT W. YOUNG.

Witnesses:
J. B. THURSTON,
W. H. DRURY.